Aug. 3, 1926.
C. D. BEDFORD
1,594,993
TIRE PRESSURE GAUGE
Filed Oct. 23, 1925    3 Sheets-Sheet 1
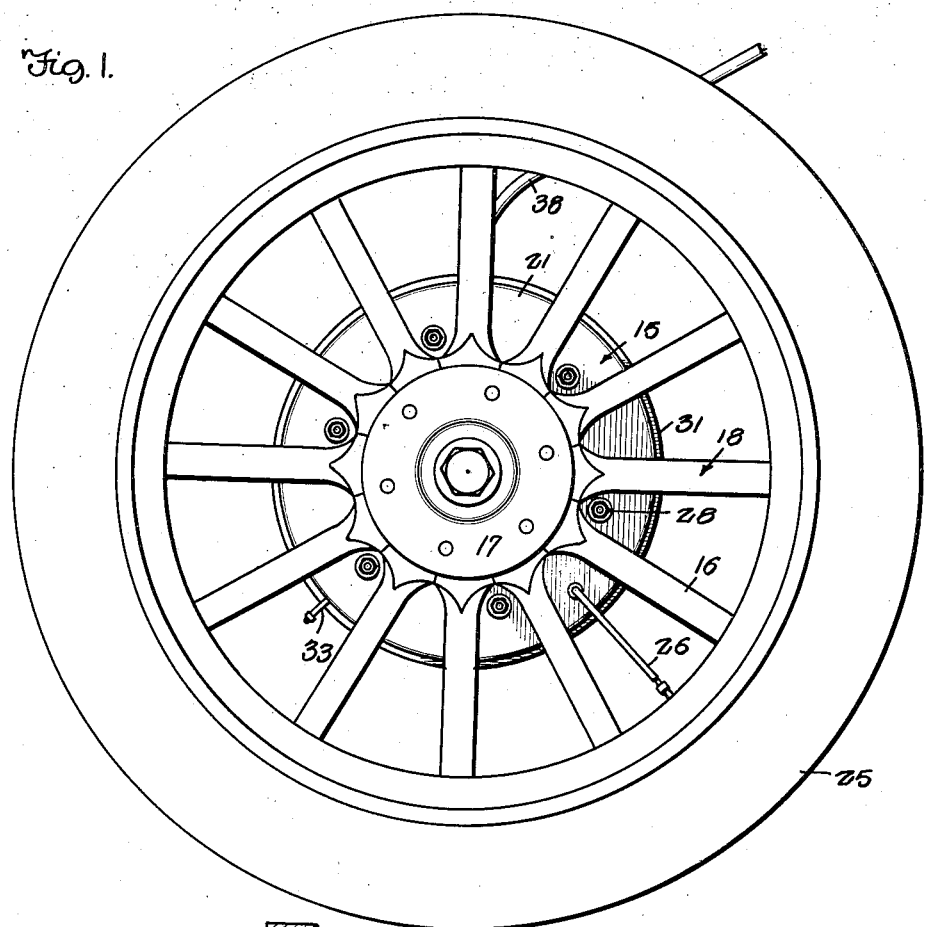
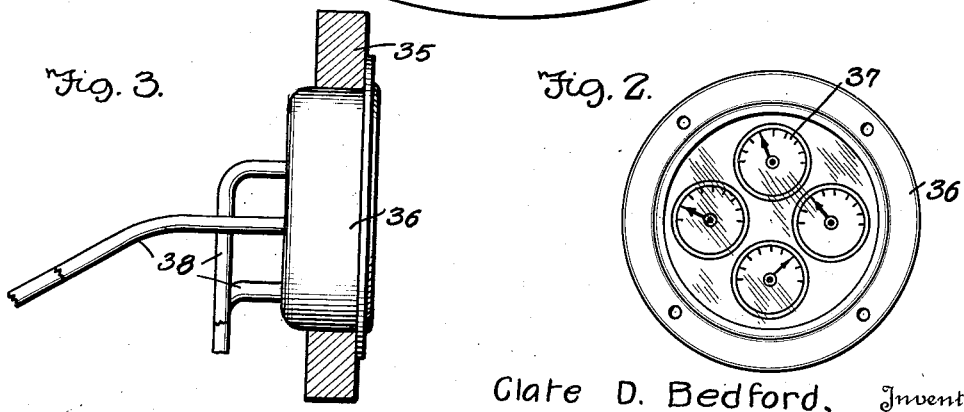
Clate D. Bedford, Inventor
Witnesses
C. E. Churchman Jr
By Richard B. Owen
Attorney Aug. 3, 1926.
C. D. BEDFORD
1,594,993
TIRE PRESSURE GAUGE
Filed Oct. 23, 1925
3 Sheets-Sheet 2
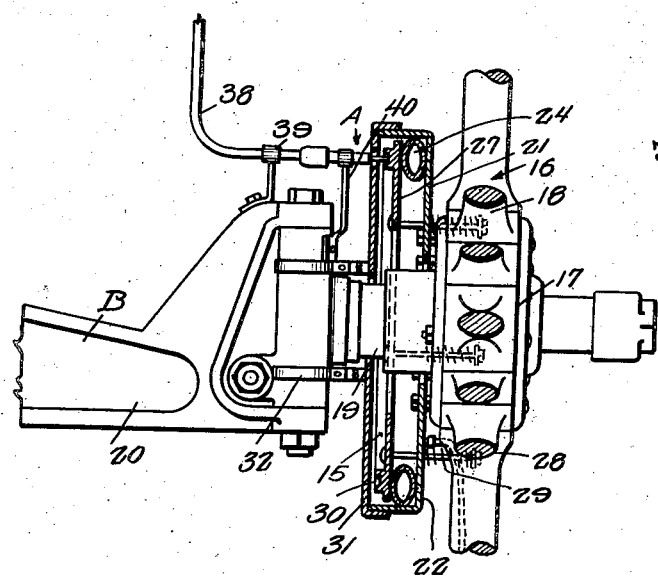
Fig. 4.
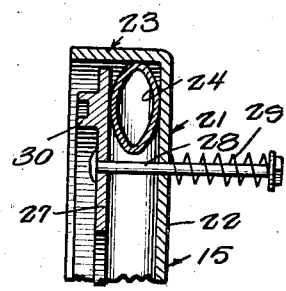
Fig. 5.
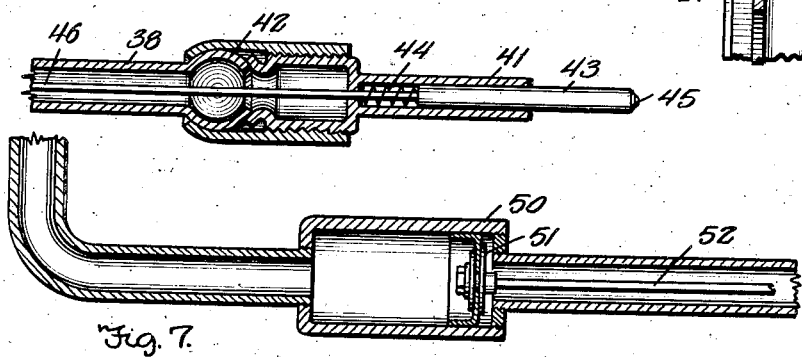
Fig. 6.
Fig. 7.
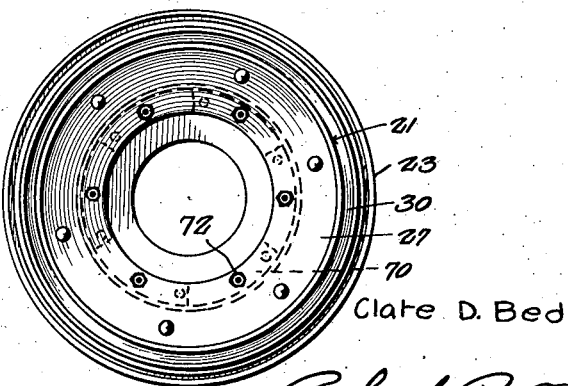
Fig. 12.
Inventor
Clate D. Bedford
By Richard B. Owen
Attorney
Witnesses
C. E. Churchman Jr.

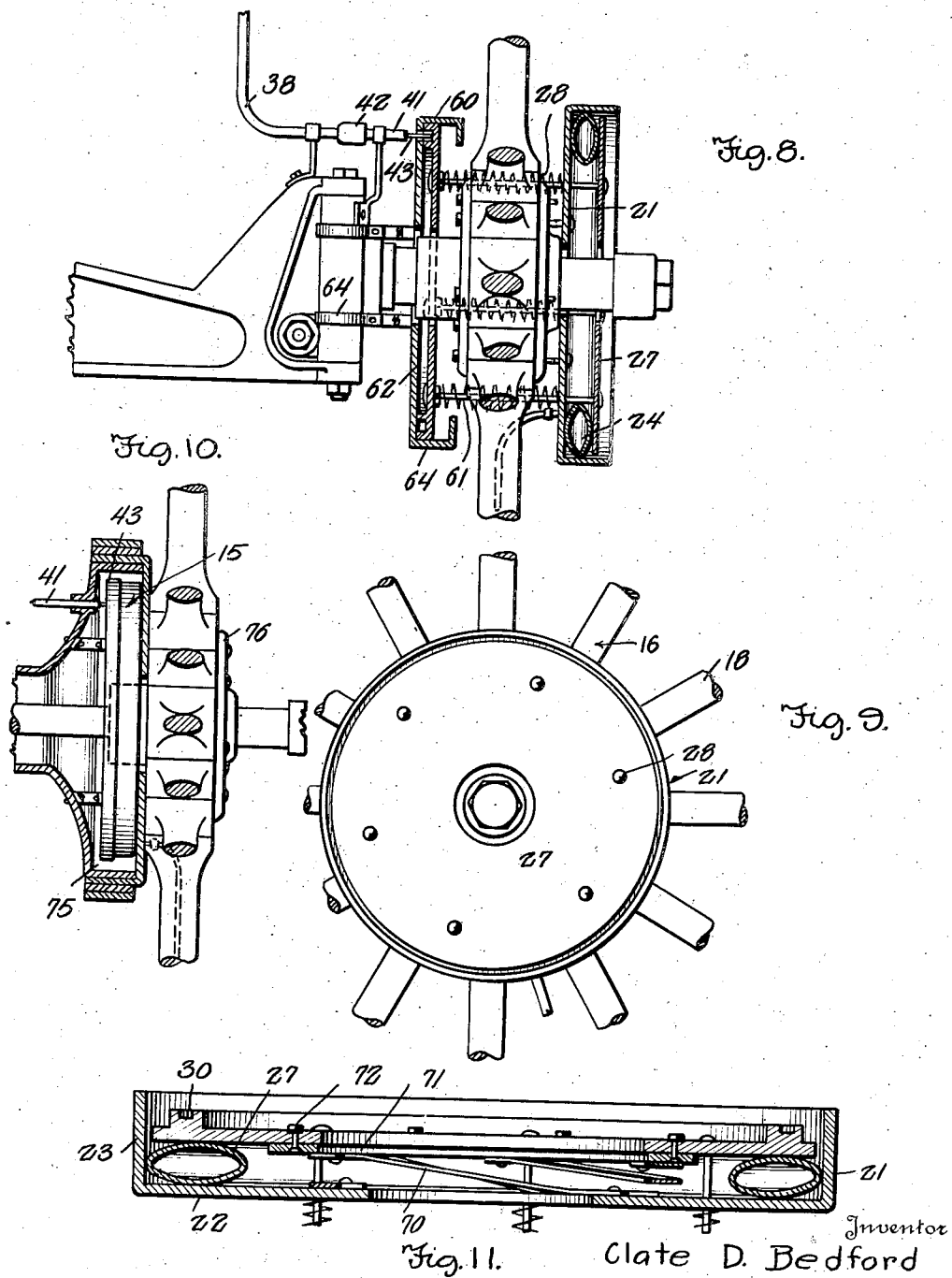

Patented Aug. 3, 1926.

1,594,993

UNITED STATES PATENT OFFICE.

CLATE D. BEDFORD, OF BEAUMONT, TEXAS.

TIRE-PRESSURE GAUGE.

Application filed October 23, 1925. Serial No. 64,437.

This invention appertains to automobile appliances and more particularly to novel means for indicating the pressure of the tires of the automobile on the dashboard thereby eliminating the necessity of the driver of the vehicle leaving his seat to test the tires.

The primary object of the present invention is the provision of novel pressure members associated with each wheel of the vehicle and having communication with the pneumatic tires thereof, and novel means actuated by said pressure members for operating indicators located at an advantageous point on the motor vehicle within the driver's vision to permit the condition of the tires to be readily seen, without the driver of the vehicle leaving his seat.

Another object of the invention is the provision of a novel casing associated in any preferred way with each vehicle wheel for the reception of an air pressure member having communication with the pneumatic tire of a wheel and a pressure plate for engaging the pressure member, the pressure plate being normally urged toward the pressure member and having associated therewith a novel guide track or raceway against which is adapted to bear an indiactor operating plunger.

A still further object of the invention is to provide an improved tire indicator for automobiles of the above character, which will be durable and efficient in use, one that will be simple and easy to manufacture and one which can be incorporated with existing types of automobiles at a small cost.

With these and other objects in view, the invention consists in the novel construction, arrangement and formation of parts, as will be hereinafter more specifically described, claimed, and illustrated in the accompanying drawings, in which:

Figure 1 is a side elevation of an automobile wheel showing one of the improved pressure devices incorporated therewith, Figure 2 is a front elevation of the indicator which is adapted to be associated with an automobile at any preferred point within the driver's vision, such as the dashboard.

Figure 3 is a transverse section through the dashboard of an automobile with the indicator incorporated therewith, Figure 4 is a section through one of the pressure devices showing the same incorporated with one of the front steering wheels of an automobile, Figure 5 is an enlarged detail section through the casing of one of the pressure indicating members, the dust cover being shown removed, Figure 6 is an enlarged detail section through the operating plunger for engaging the pressure operated raceway, Figure 7 is a detail longitudinal section showing a modified form of means for operating the indicator from the plunger, Figure 8 is a view similar to Figure 4 illustrating a modified form of the invention, showing the pressure member on the outside of the wheel, Figure 9 is a fragmentary elevation of an automobile wheel with the modified form of the device incorporated therewith, Figure 10 is a detail sectional view illustrating the means of incorporating one of the pressure devices with the brake drum of the automobile, Figure 11 is a detail section through a still further modified form of one of the pressure members showing the use of leaf springs housed within the casing for normally urging the pressure plate in engagement with the pressure tube, Figure 12 is a front elevation of the same.

Referring to the drawings in detail, wherein similar reference characters designate corresponding parts throughout the several views, the letter A generally indicates the improved tire indicating device for an automobile B which can be of any conventional type.

The improved tire indicating device A comprises a pressure member 15 which is adapted to be associated with each wheel of the automobile B. These pressure indicating members 15 can be associated with the wheels in any preferred way and in Figure 4 I have shown one method of incorporating the same with a front wheel 16 of the automobile. The wheel 16 has been shown of the conventional artillary type, but it is to be understood that the same can be associated with other wheels either of the disk or wire spoke type. The wheel 16 includes the usual hub 17 and spokes 18 and is rotatably mounted upon the usual swinging stub axle or spindle 19 carried by the dead axle 20. In this form of the invention the pressure member 15 is arranged on the inside of the wheel 16 and includes a casing 21 which can be constructed from sheet metal. The casing 21 includes an inner disk shaped wall 22 and the annular outer side wall 23. Arranged directly within the casing is a pressure tube 24 which can be of a relatively small character and this tube 24 has direct communication with the pneumatic tire 25 of the wheel 15 by means of a suitable tube 26. The casing 21 is connected to the hub 17 in any preferred way and if desired the hub bolts can be utilized for this purposes. Disposed directly within the casing 21 is a pressure plate 27 which engages the pressure tube 24. This pressure plate is adapted to be normally held in contact with the pressure tube at all times so that the same will be moved in and out of the casing according to the pressure of the air within the tube. In order to effect this a plurality of bolts 28 are carried by the pressure plate 27 and slidably extend through the wall 22 of the casing 21. Expansion springs 29 are coiled about the said bolts and this normally tends to hold the said plate in firm contact with the tube. As shown the bolts 28 and the springs 29 are arranged between the spokes 18 in order to conserve space. Associated directly with the pressure plate 27 is an annular guide track or rackway 30 the purpose of which will be hereinafter more fully described.

A cover 31 can be provided for the casing in order to protect the raceway and other parts of the pressure device from dust or road grit. This cover 31 is held stationary and can be connected by the use of suitable clamps 32 with the wheel spindle.

Arranged on the dashboard 35 of the automobile B is a suitable indicator casing 36 in which is mounted independent indicators 37 for showing the pressure of each of the tires of the automobile. Any desired means can be employed for actuating the indicators 37 from the pressure plates 27 of the pressure members and as shown in Figures 4 and 6 I provide a tube 38 leading from the casing 36 and communicating with one of the indicators 37. The various tubes 38 are led from their indicators toward the four wheels of the automobile and as shown in Figure 4 one of the tubes 38 is connected by the use of a suitable bracket 39 with the terminal of the axle 20. A second bracket 40 is connected with the wheel spindle and supports the plunger casing 41. The casing 41 is connected to the tube 38 directly above the wheel spindle by the use of a suitable ball and socket joint 42 as clearly shown in Figure 6 of the drawings. This will permit the free swinging of the plunger casing with the wheel spindle. A plunger 43 is mounted within the casing 41 and is normally urged, by means of a spring 44 in engagement with the raceway 30. To prevent wear on the plunger the inner end of the same can carry a ball bearing or the like 45 for engaging the raceway. Connected with the plunger 43 is a stiff wire 46 which can lead to the tire indicator 37 for actuating the pointer thereof.

As stated other means can be employed for actuating the pointer of the indicator and in Figure 7 I have shown another means. This means also embodies a tube having incorporated therein a plunger chamber 50 in which is reciprocably mounted the piston or plunger 51. This piston can be connected with the plunger 43 by the use of a short flexible wire 52. The tube with which the plunger casing 50 communicates with can be filled with an air or liquid column to be acted on by the said plunger or piston.

In operation of the improved device the air pressure within the tube 24 will be the same as the air pressure within the pneumatic tire owing to its direct connection therewith and any expansion and contraction of the tube 24 will vary the position of the pressure plate 27 within the casing. Movement of the pressure plate will be transmitted to the plunger 43, which consequently will operate the indicator and thus give the driver of the vehicle direct knowledge of the tire pressure.

In Figure 8 of the drawings I have shown a modified form of means of connecting the pressure member in position and in this form the casing 21 is secured to the outer face of the wheel. This means of connecting the casing in place is utilized when there is not sufficient space between the wheel and the axle end to accommodate said casing. When the casing 21 is secured to the outer face of the wheel the bolts 28 extend between the spokes to the opposite side of the wheel and support the raceway or guide 60. This raceway or guide 60 is similar to the raceway 30, the only difference being that the same is formed separate from the pressure plate 27. Relatively heavy expansion springs 51 are coiled about the bolts 28 and have their opposite ends engaging the casing and the plate which supports the raceway and it is thus obvious that the pressure plate will be normally held in contact with the pressure tube 24. The same means is utilized for transferring the varying positions of the pressure plate 27 to the indicators. In this form of the invention I also provide a novel dust guard 62 for the raceway 60 and this guard is in the nature of a plate which can be connected by the use of suitable clamps 63 with the axle spindle. Guide ears 64 can be carried by the periphery of the guard 62, in order to insure the proper holding of the dust plate in position.

It is obvious that various changes in construction can be made and if preferred the expansion coil springs can be entirely eliminated and leaf springs substituted therefor. This construction has been shown in Figures 11 and 12 and it is to be noted that a plurality of leaf springs 70 are arranged directly within the casing 21 between the disk shaped wall 22 thereof and the pressure plate 27. The springs 70 are disposed in angular formation with one overlying the other and these springs have their opposite terminals riveted or otherwise secured to the wall 22 and an annular attaching plate 71 which can be removably connected, by means of bolts 72, to the pressure plate 27.

In Figure 10 of the drawings I have illustrated one method of incorporating the novel pressure members with a rear wheel. In this instance the pressure member 15 can be arranged directly within the brake drum 75 which is carried by the rear wheel 76. The pressure member 15 can be connected in any preferred way within the brake drum and is of the same construction as the pressure members heretobefore described and thus the member will not be described in detail. It is to be noted however that the indicator operating plunger 43 can have its casing 41 carried directly by the brake drum and in view of the fact that the brake drum does not swing the necessity of providing the ball and socket joint 42 is eliminated. By placing the pressure member directly within the brake drum a neat and attractive job will be had and no operating part will be exposed to the eye. In automobiles utilizing brakes on all four wheels the pressure members can be incorporated within the brake drums of the front wheels as well as the brake drums on the rear wheels.

From the foregoing description it can be seen that I have provided an exceptionally simple and durable device, which can be readily incorporated with a conventional automobile without change thereto for indicating the pressure of the vehicle tires on the dashboard.

The vehicle tires can be pumped up in the ordinary way or if preferred the pressure tubes 24 can be provided with conventional tire filling valves 33 which will permit the tires to be readily pumped up from the pressure tubes 24.

Changes in details may be made without departing from the spirit or scope of this invention, but:

What I claim as new is:

1. In an automobile, the combination with an automobile wheel having a pneumatic tire and an instrument board, of an indicator carried by the instrument board, a raceway carried by the wheel, a pressure operated member for transmitting motion to the raceway, means for establishing communication between the tire and the pressure operated member, a plunger carried by the vehicle for engaging the raceway and means for actuating the indicator from the plunger.

2. In an automobile, the combination with an automobile chassis, a dashboard and a wheel having a pneumatic tire, of an indicator associated with the dashboard, a pressure operated member carried by the wheel, means for establishing communication between the tire and pressure operated member, an annular raceway mounted upon the wheel for rotation therewith connected with said pressure operated member for movement thereby, a plunger associated with the chassis engaging the raceway and means for operating the indicator from the plunger.

3. In an automobile, the combination with an automobile chassis and a wheel having a pneumatic tire, of an indicator arranged within the vision of the driver of the vehicle, a pressure containing member carried by the wheel, means for establishing communication between the tire and said pressure containing member, an annular raceway associated with the wheel for rotation therewith, means for operating the raceway from the pressure containing member, a movable plunger carried by the chassis, means normally holding the plunger in engagement with the raceway for actuation thereby, and means for operating the indicator from the plunger.

4. In a vehicle, the combination with a vehicle wheel having a pneumatic tire, of a casing associated with the wheel for rotation therewith, a pressure containing member arranged within the casing, means for establishing communication between the tire and the pressure containing member, an operating member, resilient means normally holding the operating member in engagement with the pressure containing member for actuation thereby, and an indicator operatively connected with said operating member.

5. In a tire pressure indicating means, a casing adapted to be associated with a vehicle wheel, an expansible pressure containing member adapted to have communication with a pneumatic tire, means engaging the expansible member, resilient means normally urging the means engaging the expansible member in contact therewith at all times and an annular raceway connected with said pressure engaging member for movement therewith.

6. In a tire pressure indicating means, a casing adapted to be associated with an automobile wheel for movement therewith, a pressure tube arranged within the casing adapted to have communication with an automobile tire, a plate arranged within the casing, means normally urging the plate in contact with the tube at all times, and an annular raceway carried by said plate for movement therewith.

7. In a tire pressure indicator, the combination with a vehicle wheel having a pneumatic tire, of a casing fitted on the wheel around the hub of the wheel, an annular pressure containing tube arranged within the casing about the hub, a pressure operated plate disposed within the casing and surrounding the hub, spring means normally urging the plate in contact with the tube, an annular raceway arranged concentrically on the wheel and operatively connected with the plate for movement therewith and an indicator operating plunger for engaging the raceway.

In testimony whereof I affix my signature.

CLATE D. BEDFORD.